US006224931B1

(12) United States Patent
Narimatsu et al.

(10) Patent No.: US 6,224,931 B1
(45) Date of Patent: May 1, 2001

(54) METHOD OF PRODUCING DRY NOODLES

(75) Inventors: Hiroki Narimatsu; Tomoko Yasunara; Akihiro Nakamura; Yoko Sato; Hirokazu Maeda, all of Izumisano (JP)

(73) Assignee: Fuji Oil Co., Ltd., Osaka (JP)

( * ) Notice: Subject to any disclaimer, the term of this patent is extended or adjusted under 35 U.S.C. 154(b) by 0 days.

(21) Appl. No.: 09/397,882

(22) Filed: Sep. 17, 1999

(30) Foreign Application Priority Data

Nov. 2, 1998 (JP) .................................. 10-311743

(51) Int. Cl.[7] ................ A23L 1/16; A21D 6/00
(52) U.S. Cl. ................ 426/451; 426/455; 426/456; 426/557
(58) Field of Search ................ 426/557, 94, 96, 426/451, 455, 456

(56) References Cited

U.S. PATENT DOCUMENTS

| 5,332,587 | * | 7/1994 | Howard et al. | 426/128 |
| 5,433,964 | * | 7/1995 | Norman et al. | 426/303 |
| 5,738,896 | * | 4/1998 | Cassetta et al. | 426/557 |
| 5,786,021 | * | 7/1998 | Satoh et al. | 426/634 |
| 6,022,575 | * | 2/2000 | Lee et al. | 426/557 |

FOREIGN PATENT DOCUMENTS

| 06121647 | * | 5/1994 | (JP) . |
| 10127251 | * | 5/1998 | (JP) . |

* cited by examiner

*Primary Examiner*—Nina Bhat
(74) *Attorney, Agent, or Firm*—Wallenstein & Wagner, Ltd.

(57) ABSTRACT

A method of production of dried noodles, in which the dried noodles are fried noodles of the type which are prepared by adding hot water, etc. or by cooking, or hot air-dried or freeze-dried type noodles, whereby the noodles are treated with water-soluble hemicellulose during one of the steps of production of the noodles.

22 Claims, No Drawings

METHOD OF PRODUCING DRY NOODLES

BACKGROUND OF THE INVENTION

1. Field of the Invention

The present invention relates to a method of producing dry noodles. The term "noodles" will be used throughout in a wide sense to include pastas, Japanese noodles, Chinese noodles and the like.

2. Description of the Related Art

When cooked, dry noodles, such as fried noodles, hot-air dried noodles, freeze-dried noodles, etc., usually have a different feel in the mouth than traditional noodles, and rarely match the requirements of today's consumers who desire an authentic taste. They differ from raw noodles particularly in the aspects of "firmness", "glutinosity" and "smoothness/swallowability". Furthermore, while efforts have been made to develop many different soups that can match the varied preferences of today's consumers, there has not been a similar diversification in the noodles themselves, and this situation is believed to occur because the method of rehydrating with hot water, for example, is an impediment to diversification of the noodles themselves.

Another problem which occurs during processing is that the noodle strands adhere to each other after cooking (pregelatinization). Such adhesion between noodle strands has a major adverse effect during processing such as water treatment, flavoring, acidifying, frying, hot air drying, etc. which follows the cooking (pregelatinization) of the noodle strands, while the disadvantage of poor loosening also occurs even when hot water is added for rehydration of the noodles after they have been so processed, and therefore no satisfactory solution has yet been achieved.

BRIEF SUMMARY OF THE INVENTION

It is an object of the present invention to provide a method of producing dry noodles which allows a fast hot rehydration (restoration) time, which allows production of a wide variety of noodle shapes such as thick noodles, and which endows the noodles with glutinosity and smoothness or improves the adhesion between noodle strands during the process, making it possible to improve their loosening upon hot rehydration.

As a result of diligent research aimed at achieving the object stated above, the present inventors have found that a solution can be obtained by treating dry noodles with water-soluble hemicellulose at some point during the process of producing the noodles. The present invention has been completed on the basis of this finding.

In other words, the present invention is a method of producing dry noodles which includes treatment of the noodles with water-soluble hemicellulose prior to drying.

DETAILED DESCRIPTION OF THE INVENTION

The dry noodles in the invention can be prepared using a common dry noodle raw material, and the raw farina used may be any type of flour such as wheat flour, rice flour, buckwheat flour, corn starch, potato starch or tapioca starch, either alone or in admixture. As starch there may be used raw starch or processed starch such as pregelatinized starch or etherified starch.

According to the invention, one method for treating the noodles with water-soluble hemicellulose involves adding the water-soluble hemicellulose to the noodle dough. The method of addition to the noodle dough can be addition of powdered water-soluble hemicellulose prior to kneading of the raw farina and kneading water, or alternatively the water-soluble hemicellulose may be dissolved together with cold water or various salts in the kneading water and added as a water-soluble hemicellulose solution for kneading with the raw flour.

The appropriate amount of water-soluble hemicellulose to be combined with the raw farina will change depending on the type of raw flour and the amount and nature of the structural additives, but generally speaking it is 0.1–5.0 wt %, and preferably 0.2–2.0 wt % with respect to the raw flour. This addition to the dough can give an effect of more rapid hot rehydration of the dry noodles, and provide glutinosity and smoothness (a slippery feel). If the amount is too low it will be difficult to achieve this effect, and if it is too high the feel in the mouth, taste, etc. of the dry noodles will be poor.

According to the invention, another method of treating the noodles with water-soluble hemicellulose involves dissolving or dispersing the water-soluble hemicellulose in a treatment liquid for water treatment, acidifying, flavoring, etc. to be carried out after cooking (pregelatinization) of the noodle strands, and then immersing or spraying the noodles with the treatment liquid. Performing such treatment will improve adhesion between noodle strands and allow better loosening upon hot rehydration, and such treatment can also be carried out in combination with the aforementioned addition of water-soluble hemicellulose to the noodle dough.

The amount of addition of water-soluble hemicellulose to the treatment liquid will change depending on the type of treatment liquid and the amount and nature of the structural additives, but generally speaking it is 0.02–20 wt %, preferably 0.5–10 wt %, and more preferably 1.0–5.0 wt % with respect to the treatment liquid. If the amount is too low it will be difficult to achieve this effect, and if it is too high the feel in the mouth, taste, etc. of the dry noodles will be poor.

The water-soluble hemicellulose in the invention is preferably derived from oily seeds or grains, and especially from beans, particularly soybeans.

The water-soluble hemicellulose is hemicellulose, derived from a plant, which is soluble in water, and it has an average molecular weight (the value determined by the limiting viscosity method of measuring the viscosity in a 0.1 M NaNO$_3$ solution with standard pullulan (sold by Showa Denko, KK.) as the standard substance) of 50,000 to 1,000,000, and preferably 100,000 to 400,000.

Suitable water-soluble hemicellulose comprises the constituent sugars rhamnose, fucose, arabinose, xylose, galactose, glucose and uronic acid. However, depending on the average molecular weight or type of plant, it is appropriate even if either or both rhamnose or fucose are absent, or if it contains mannose and fructose. The uronic acid is measured by the Blumenkrantz method, and the neutral sugars are measured by GLC after alditol acetate conversion.

The water-soluble hemicellulose can be water-extracted from hemicellulose-containing raw material, and in some cases eluted by heating under alkali conditions or eluted by decomposition with enzymes. The following is an example of a method of producing water-soluble hemicellulose.

Specifically, the raw material used may be a plant material, such as oily seeds of, for example soybean, palm, coconut, corn, cottonseed, etc. with the oil or protein removed, or the lees of grains, for example rice or wheat, from which the starch has been removed. When the raw material is soybeans, okara (bean-curd refuse) may be used as a by-product from preparation of tofu (bean curd) and soybean milk or separated soybean protein.

These starting materials may be subjected to heat extraction at a temperature preferably of from 80° C. to 130° C., and more preferably from 100° C. to 130° C., under either acidic or alkali conditions but preferably at a pH near the isoelectric point of each protein, and after separation of the water-soluble fraction, it may be dried directly or preferably subjected to activated carbon treatment, resin adsorption treatment or ethanol precipitation to remove the hydrophobic substances or low molecular substances, and then dried to yield the desired water-soluble hemicellulose.

According to the invention, the water-soluble hemicellulose may be used alone or in combination with other quality enhancers or additives as deemed suitable. As other quality enhancers and additives there may be mentioned oily substances including common animal oils and the oil-soluble vitamin tocopherol; saccharides such as sucrose, maltose and trehalose; polysaccharide hydrolysates, including sugar alcohol, dextrin, glue plant (funori), agar, carrageenan, furcellaran, tamarind seed polysaccharides, angelica gum, karaya gum, pectin, xanthan gum, sodium alginate, tragacanth gum, guar gum, locust bean gum, pullulan, jellan gum, gum arabic, hyaluronic acid, cyclodextrin, chitosan, carboxymethylcellulose (CMC), propylene glycol alginate ester and processed starch and other starches; proteinaceous substances such as gelatin, whey and other albumins, casein sodium, soluble collagen, egg white, egg yolk, soybean protein, etc., and their decomposition products; emulsifiers such as glycerin fatty acid esters, sucrose fatty acid esters, lecithin, etc.; bases such as calcium reinforcers; and pH adjusters such as sodium acetate. Thus, the water-soluble hemicellulose according to the invention may be distributed and sold not only in the form of a powder, but also in emulsified or suspended form with a fat or oil, or in solution form in water, saline or a solution of an organic acid such as acetic acid.

Embodiments of the invention will now be introduced through examples which are, however, only exemplary and are not intended to restrict the spirit of the invention. Throughout the examples, the percentages and parts are given in terms of weight.

Preparation of Water-Soluble Hemicellulose

To raw okara obtained from production of separated soybean protein there was added a 2-fold amount of water, and, after adjustment to pH 4.5 with hydrochloric acid, the mixture was hydrolyzed at 120° C. for 1.5 hours. After cooling, the mixture was centrifuged (10,000 G×30 minutes) and the supernatant and precipitate portion were separated. The separated precipitate portion was washed with an equivalent weight of water, and the supernatant obtained by subsequent centrifugation was combined with the previous supernatant, treated with an active carbon column and dried to obtain water-soluble hemicellulose. The properties were as follows.

| Water-soluble hemicellulose composition (wt %) | |
| --- | --- |
| Water | 5.71 |
| Crude protein | 1.93 |
| Crude ash | 5.29 |

| -continued | |
| --- | --- |
| Carbohydrate content | 87.07 |
| Average molecular weight | 178,000 |

| Water-soluble hemicellulose sugar composition (wt %) | |
| --- | --- |
| Uronic acid | 20.4 |
| Rhamnose | 1.6 |
| Fucose | 2.7 |
| Arabinose | 19.9 |
| Xylose | 6.4 |
| Galactose | 47.3 |
| Glucose | 1.8 |

EXAMPLE 1

Instant dry noodles (instant fried noodle type) were prepared with the following compositions by the steps described below. The preferred range for addition of water-soluble hemicellulose was investigated.

| • Compositions (parts) | | | | |
| --- | --- | --- | --- | --- |
| | Composition 1 | Composition 2 | Composition 3 | Composition 4 |
| Wheat flour | 90.0 | 90.0 | 90.0 | 90.0 |
| Starch | 10.0 | 10.0 | 10.0 | 10.0 |
| Cold water | 0.25 | 0.25 | 0.25 | 0.25 |
| Salt | 1.0 | 1.0 | 1.0 | 1.0 |
| Calcium carbonate | 1.0 | 1.0 | 1.0 | 1.0 |
| Water-soluble soybean hemicellulose | 1.0 | 0.5 | 0.08 | — |
| Kneading water | 30.0 | 30.0 | 30.0 | 30.0 |

Preparation Steps for Instant Dry Noodles

1. For the added compositions, the water-soluble hemicellulose powder is mixed as a powder with the wheat flour and starch, to prepare a raw powder.
2. The cold water and salt are dissolved in the kneading water, and the calcium carbonate is dispersed therein.
3. The kneading water in 2. is added to the raw powder, and the mixture is kneaded with a mixer for 15 minutes to prepare noodle dough; compounding, rolling and noodle strand cutting are carried out by common methods, and the noodles are steamed for 6 minutes in a steamer for pregelatinization, after which a portion for one meal is measured out, placed in a retainer and fried at 140° C. for 1 minute and 30 seconds, and the fried noodles are cooled to make instant fried noodles.

| • Evaluation | | | | |
| --- | --- | --- | --- | --- |
| | Composition 1 | Composition 2 | Composition 3 | Composition 4 |
| Speed of hot rehydration | ⊚ | ○ | x | xx |
| Swallowability (smoothness) | ⊚ | ⊚ | x | xx |
| Glutinosity | ⊚ | ○ | x | xx |

Evaluation standard: ⊚ very satisfactory, ○ satisfactory, Δ normal, x somewhat poor, xx poor Sampling method: The sampling was performed by five professional panelists. Specifically, powdered soup was added to each type of instant fried noodles, 400 ml of hot water was added, the cap was fitted and the noodles were allowed to stand for 3 minutes for hot rehydration, after which they were stirred and the sampling was initiated immediately.

According to the results, the noodles to which 1.0 part of water-soluble hemicellulose was added to 100 parts of raw flour (Composition 1) were very satisfactory in all of hot rehydration, swallowability (smoothness) and glutinosity. Also, those with water-soluble hemicellulose addition of 0.5 part (Composition 2) were satisfactory in all of hot rehydration, swallowability (smoothness) and glutinosity, but were particularly satisfactory from the standpoint of swallowability (smoothness). In contrast, those with water-soluble hemicellulose addition of 0.08 part (Composition 3) were somewhat poor in all of hot rehydration, swallowability (smoothness) and glutinosity, and particularly poor in hot rehydration, although it was better than those to which no water-soluble hemicellulose had been added (Composition 4). Those to which no water-soluble hemicellulose had been added (Composition 4) were inferior in all of hot rehydration, swallowability (smoothness) and glulinosity.

EXAMPLE 2

The superiority of water-soluble hemicellulose over other polysaccharides was examined. Different polysaccharides were added to Composition 4 of Example 1. The amount of each added was 1% with respect to the raw wheat flour and starch.

| | • Evaluation | | | | | |
|---|---|---|---|---|---|---|
| | A | B | C | D | E | F |
| Speed of hot rehydration | ⊚ | xx | x | Δ | x | xx |
| Swallowability (Smoothness) | ⊚ | x | x | Δ | x | x |
| Glutinosity | ⊚ | xx | x | Δ | xx | xx |

Designations in table: A: water-soluble hemicellulose, B: guar gum, C: pectin, D: gum arabic, E: cellulose F: xanthan Evaluation standard: ⊚ very satisfactory, ○ satisfactory, Δ normal, x somewhat poor, xx poor The sampling was performed as in Example 1.

According to the results, the noodles (A) to which water-soluble hemicellulose was added were very satisfactory in all of hot rehydration, swallowability (smoothness) and glutinosity. In contrast, those (B) to which guar gum was added were poor from the standpoint of hot rehydration and glutinosity, and had somewhat poor swallowability (smoothness). Those (C) to which pectin was added were somewhat poor in all of hot rehydration, swallowability (smoothness) and glutinosity. Those (D) to which gum arabic was added were normal in all of hot rehydration, swallowability (smoothness) and glutinosity, and exhibited no especially excellent results. Those (E) to which cellulose was added were somewhat poor from the standpoint of hot rehydration and swallowability (smoothness) and poor from the standpoint of glutinosity. Those (F) to which xanthan was added were poor from the standpoint of hot rehydration and glutinosity, and somewhat poor from the standpoint of swallowability (smoothness). These results allowed confirmation that water-soluble hemicellulose indeed has an excellent effect.

EXAMPLE 3

The improvement in adhesion between noodle strands was examined after carrying out types of treatment such as water treatment, acidifying, flavoring, etc. after cooking. The production process involved immersion in a treatment solution prepared by dissolving water-soluble soybean hemicellulose to the treatment solution after pregelatinization in the steps of Example 1, draining for one minute, and then preparing instant fried-type noodles by the steps of Example 1. The composition of the instant dry fried noodles was that of Composition 4 of Example 1.

| • Compositions of treatment solutions (%) | | | | | |
|---|---|---|---|---|---|
| | (1) | (2) | (3) | (4) | (5) |
| Water | 95 | 93 | 94 | 94.8 | 89 |
| Salt | 5 | 5 | 5 | 5 | |
| Water-soluble hemicellulose | — | 2 | 0.02 | 0.01 | 6 |

| • Evaluation | | | | | |
|---|---|---|---|---|---|
| | (1) | (2) | (3) | (4) | (5) |
| Loosening after treatment | xx | ⊚ | ○–Δ | x | ⊚ |
| Loosening upon hot rehydration | xx | ⊚ | ○–Δ | x | ⊚ |

Evaluation scale: ⊚ very satisfactory, ○ satisfactory, Δ normal, x somewhat poor, xx poor The method of hot rehydration was the same as in Example 1. Specifically, powdered soup was added to the noodles, 400 ml of hot water was added, the cap was fitted and the noodles were allowed to stand for 3 minutes for hot rehydration. The loosening upon hot rehydration was evaluated by taking up with a pair of chopsticks.

As in the previous results, it was found that dissolution of water-soluble hemicellulose in the cooked (pregelatinized) treatment solutions was effective. The 6% addition in (5) was effective for loosening, but tended to have a slightly poorer taste.

EXAMPLE 4

The effectiveness of water-soluble hemicellulose for hot air-dried noodles was confirmed.

The following compositions were used to prepare hot air-dried noodles by the steps described below.

| • Compositions (parts) | | | | |
|---|---|---|---|---|
| | (1) | (2) | (3) | (4) |
| Wheat flour | 100 | 100 | 100 | 100 |
| Cold water | 0.25 | 0.25 | 0.25 | 0.25 |
| Salt | 1.5 | 1.5 | 1.5 | 1.5 |
| Kneading water | 34 | 34 | 34 | 34 |
| Water-soluble hemicellulose | — | 1.0 | 9.5 | 0.08 |

Production Steps

1. For the added compositions, the water-soluble hemicellulose powder is mixed as a powder with the wheat flour to prepare a raw powder.

2. The cold water and salt are dissolved in the kneading water.

3. The kneading water in 2. is added to the raw powder, and the mixture is kneaded with a mixer for 15 minutes to prepare noodle dough; compounding, rolling and noodle strand cutting are carried out by common methods, and the noodles are steamed for 6 minutes in a steamer for pregelatinization, after which a portion for one meal is measured out, placed in a retainer and dried at 85° C. for 90 minutes, and then cooled at room temperature to make instant hot air-dried noodles.

| • Evaluation | | | | |
|---|---|---|---|---|
|  | (1) | (2) | (3) | (4) |
| Speed of hot rehydration | xx | ◎ | ○ | x |
| Swallowability (smoothness) | xx | ◎ | ○ | x |

Evaluation scale: ◎ very satisfactory, ○ satisfactory, Δ normal, x somewhat poor, xx poor The sampling was performed as in Example 1.

It was thus confirmed that water-soluble hemicellulose is also effective for instant hot air-dried noodles.

As explained above, by applying the present invention to methods for preparation of dried noodles, the hot rehydration (restoration) of the noodles is improved and the hot rehydration time is shortened, while it is adaptable to many different noodle thicknesses. Furthermore, the noodle smoothness can be improved and a better swallowability (slippery feel) can be achieved, while several other effects are exhibited including improved loosening upon hot rehydration.

What is claimed is:

1. A method of production of dry noodles which includes treatment of the noodles with water-soluble hemicellulose prior to drying.

2. A method according to claim 1, wherein the water-soluble hemicellulose is derived from soybean.

3. A method according to claim 2, wherein the treatment of the water-soluble hemicellulose comprises addition of water-soluble hemicellulose to the noodles.

4. A method according to claim 3, wherein the amount of water-soluble hemicellulose added is 0.1–5.0 wt percent based on the weight of raw farina.

5. A method according to claim 3, wherein the treatment of the water-soluble hemicellulose comprises adding the water-soluble hemicellulose to a treatment liquid for water treatment, acidifying or flavoring to be carried out after cooking (pregelatinization) of the noodle strands, and then immersing or spraying the noodles.

6. A method according to claim 4, wherein the treatment of the water-soluble hemicellulose comprises adding the water-soluble hemicellulose to a treatment liquid for water treatment, acidifying or flavoring to be carried out after cooking (pregelatinization) of the noodle strands, and then immersing or spraying the noodles.

7. A method according to claim 5, wherein the amount of water-soluble hemicellulose added is 0.2–20 weight percent based on the weight of the treatment liquid.

8. A method according to claim 6, wherein the amount of water-soluble hemicellulose added is 0.2–20 weight percent based on the weight of the treatment liquid.

9. A method according to claim 2, wherein the treatment of the water-soluble hemicellulose comprises adding the water-soluble hemicellulose to a treatment liquid for water treatment, acidifying or flavoring to be carried out after cooking (pregelatinization) of the noodle strands, and then immersing or spraying the noodles.

10. A method according to claim 9, wherein the amount of water-soluble hemicellulose added is 0.2–20 weight percent based on the weight of the treatment liquid.

11. A method according to claim 1, wherein the treatment of the water-soluble hemicellulose comprises addition of water-soluble hemicellulose to the noodles.

12. A method according to claim 11, wherein the treatment of the water-soluble hemicellulose comprises adding the water-soluble hemicellulose to a treatment liquid for water treatment, acidifying or flavoring to be carried out after cooking (pregelatinization) of the noodle strands, and then immersing or spraying the noodles.

13. A method according to claim 12, wherein the amount of water-soluble hemicellulose added is 0.2–20 weight percent based on the weight of the treatment liquid.

14. A method according to claim 11, wherein the amount of water-soluble hemicellulose added is 0.1–5.0 wt % based on the weight of raw farina.

15. A method according to claim 14, wherein the treatment of the water-soluble hemicellulose comprises adding the water-soluble hemicellulose to a treatment liquid for water treatment, acidifying or flavoring to be carried out after cooking (pregelatinization) of the noodle strands, and then immersing or spraying the noodles.

16. A method according to claim 15, wherein the amount of water-soluble hemicellulose added is 0.2–20 weight percent based on the weight of the treatment liquid.

17. A method according to claim 1, wherein the treatment of the water-soluble hemicellulose comprises adding the water-soluble hemicellulose to a treatment liquid for water treatment, acidifying or flavoring to be carried out after cooking (pregelatinization) of the noodle strands, and then immersing or spraying the noodles.

18. A method according to claim 17, wherein the treatment of the water-soluble hemicellulose comprises adding the water-soluble hemicellulose to a treatment liquid for water treatment, acidifying or flavoring to be carried out after cooking (pregelatinization) of the noodle strands, and then immersing or spraying the noodles.

19. A method according to claim 18, wherein the amount of water-soluble hemicellulose added is 0.2–20 weight percent based on the weight of the treatment liquid.

20. A method according to claim 17, wherein the amount of water-soluble hemicellulose added is 0.02–20 wt % based on the weight of the treatment liquid.

21. A method according to claim 20, wherein the treatment of the water-soluble hemicellulose comprises adding the water-soluble hemicellulose to a treatment liquid for water treatment, acidifying or flavoring to be carried out after cooking (pregelatinization) of the noodle strands, and then immersing or spraying the noodles.

22. A method according to claim 21, wherein the amount of water-soluble hemicellulose added is 0.2–20 weight percent based on the weight of the treatment liquid.

* * * * *

UNITED STATES PATENT AND TRADEMARK OFFICE
CERTIFICATE OF CORRECTION

PATENT NO. : 6,224,931 B1
DATED : May 1, 2001
INVENTOR(S) : Hiroki Narimatsu et al.

It is certified that error appears in the above-identified patent and that said Letters Patent is hereby corrected as shown below:

Title page,
Item [75], Inventors, change the second inventor's last name from "Yasunara" to -- Yasuhara --.

Signed and Sealed this

Eighth Day of January, 2002

Attest:

Attesting Officer

JAMES E. ROGAN
*Director of the United States Patent and Trademark Office*